US006887001B2

(12) United States Patent
Kitamura et al.

(10) Patent No.: US 6,887,001 B2
(45) Date of Patent: May 3, 2005

(54) KEY BUTTON STRUCTURE FOR HANDHELD MOBILE PHONE AND ITS SIMILAR INSTRUMENT, AND METHOD FOR FORMING THE SAME

(75) Inventors: Hiromu Kitamura, Tokyo (JP); Shuichi Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 67 days.

(21) Appl. No.: 10/142,788

(22) Filed: May 13, 2002

(65) Prior Publication Data

US 2002/0167787 A1 Nov. 14, 2002

(30) Foreign Application Priority Data

May 11, 2001  (JP) ........................................ 2001-141565

(51) Int. Cl.$^7$ ................................................ B41J 5/12
(52) U.S. Cl. ..................................... 400/490; 400/472
(58) Field of Search .............................. 400/490, 495, 400/472, 400; 200/520, 535, 341, 344; 341/21, 22; 361/680; 235/145 R, 145 A; 345/168, 169; 364/709.12

(56) References Cited

U.S. PATENT DOCUMENTS

| | | | | |
|---|---|---|---|---|
| 3,860,771 A | * | 1/1975 | Lynn et al. ................. 200/5 A |
| 4,493,959 A | * | 1/1985 | Viebrantz ................... 200/517 |
| 4,531,034 A | * | 7/1985 | Inaba ......................... 200/314 |
| 4,618,744 A | * | 10/1986 | Pope et al. ................. 200/5 A |
| 5,117,076 A | * | 5/1992 | Damitio ...................... 200/344 |
| 5,144,103 A | | 9/1992 | Suwa .......................... 200/344 |
| 5,247,143 A | | 9/1993 | Suwa .......................... 200/517 |
| 5,266,949 A | * | 11/1993 | Rossi ........................... 341/22 |
| 5,345,051 A | * | 9/1994 | Miike ......................... 200/345 |
| 5,581,251 A | * | 12/1996 | McRight et al. ............. 341/22 |
| 5,743,384 A | * | 4/1998 | Clark .......................... 200/344 |
| 5,912,443 A | * | 6/1999 | Hasunuma .................. 200/5 A |
| 6,107,586 A | | 8/2000 | Takeuchi et al. ............ 200/535 |

FOREIGN PATENT DOCUMENTS

GB          2 321 134 A       7/1998

* cited by examiner

*Primary Examiner*—Anthony Nguyen
(74) *Attorney, Agent, or Firm*—Young & Thompson (57) ABSTRACT

A key button switch structure for use in a handheld mobile phone, comprises an input button 1 having a push-down pressure transmitting projection A1 and a button inclination preventing projection B 3 both projected from a bottom surface of the input button, integrally with the input button. Two electrodes A9 and B 10 are formed on a substrate 8 fixed to a body casing 6. A dome-like switch contact 7 is provided to be pushed down by the push-down pressure transmitting projection A1 of the input button when the input button is depressed, thereby to electrically contact both the two electrodes. Thus, since the button inclination preventing projection B 3 is provided, even in the case that an action center line of the dome-like switch contact is not coincident with an input pressure center line of the input button, when the input button is depressed, the electrodes A9 and B 10 formed on the substrate 8 are surely electrically interconnected by the dome-like switch contact effectively uniformly collapsed by the push-down pressure transmitting projection A1 of the input button.

4 Claims, 10 Drawing Sheets

KEY BUTTON STRUCTURE FOR HANDHELD MOBILE PHONE AND ITS SIMILAR INSTRUMENT, AND METHOD FOR FORMING THE SAME

BACKGROUND OF THE INVENTION

The present invention relates to a key button structure for use in a handheld mobile phone and its similar instrument, and more specifically to a key button switch structure which can be incorporated in a handheld mobile phone and its similar instrument, and which comprises an input button having a projection, two electrodes formed on a substrate, and a dome-like switch contact to be pushed down by the projection of the input button when the input button is depressed, thereby to electrically contact both the two electrodes, and a method for forming such a key button structure.

Figure 8:
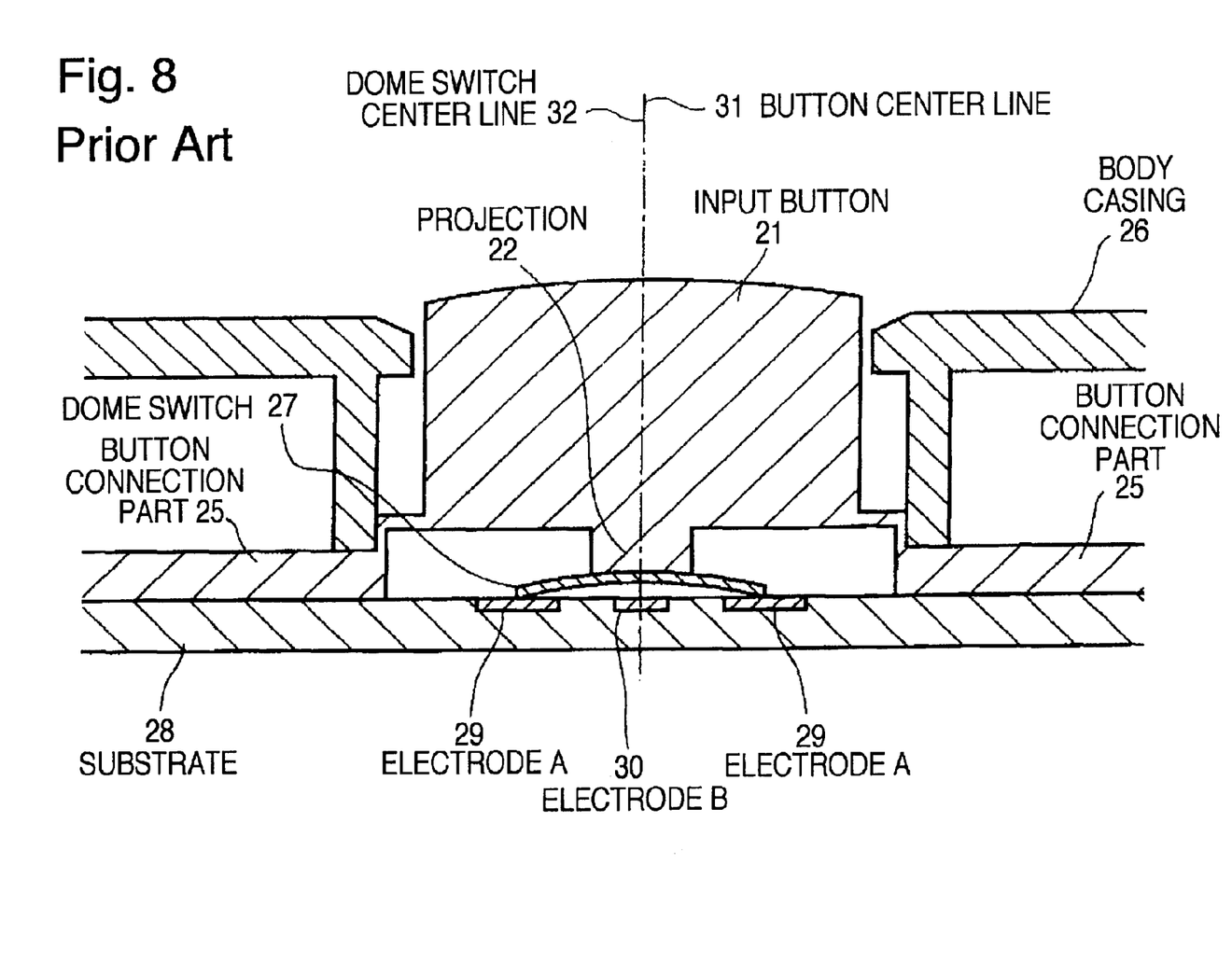
FIG. 8 is a diagrammatic section view of one input button switch in one example of the prior art key button switch structure in which the center line of the input button is coincident with the center line of the dome-like switch contact.

Referring to FIG. 8, there is shown a diagrammatic section view of one example of this type key button switch structure realized in the prior art. The shown example includes an input button 21 having a projection 22, two electrodes A 29 and B 30 formed on a substrate 28, and a dome-like switch contact 27, which are located as shown. The input button 21 is formed integrally with a button connection part 25 so that when the input button 21 is depressed, the projection 22 pushes down the dome-like switch contact 27 to cause the dome-like switch contact 27 to electrically contact both the two electrodes A 29 and B 30.

Figure 9:
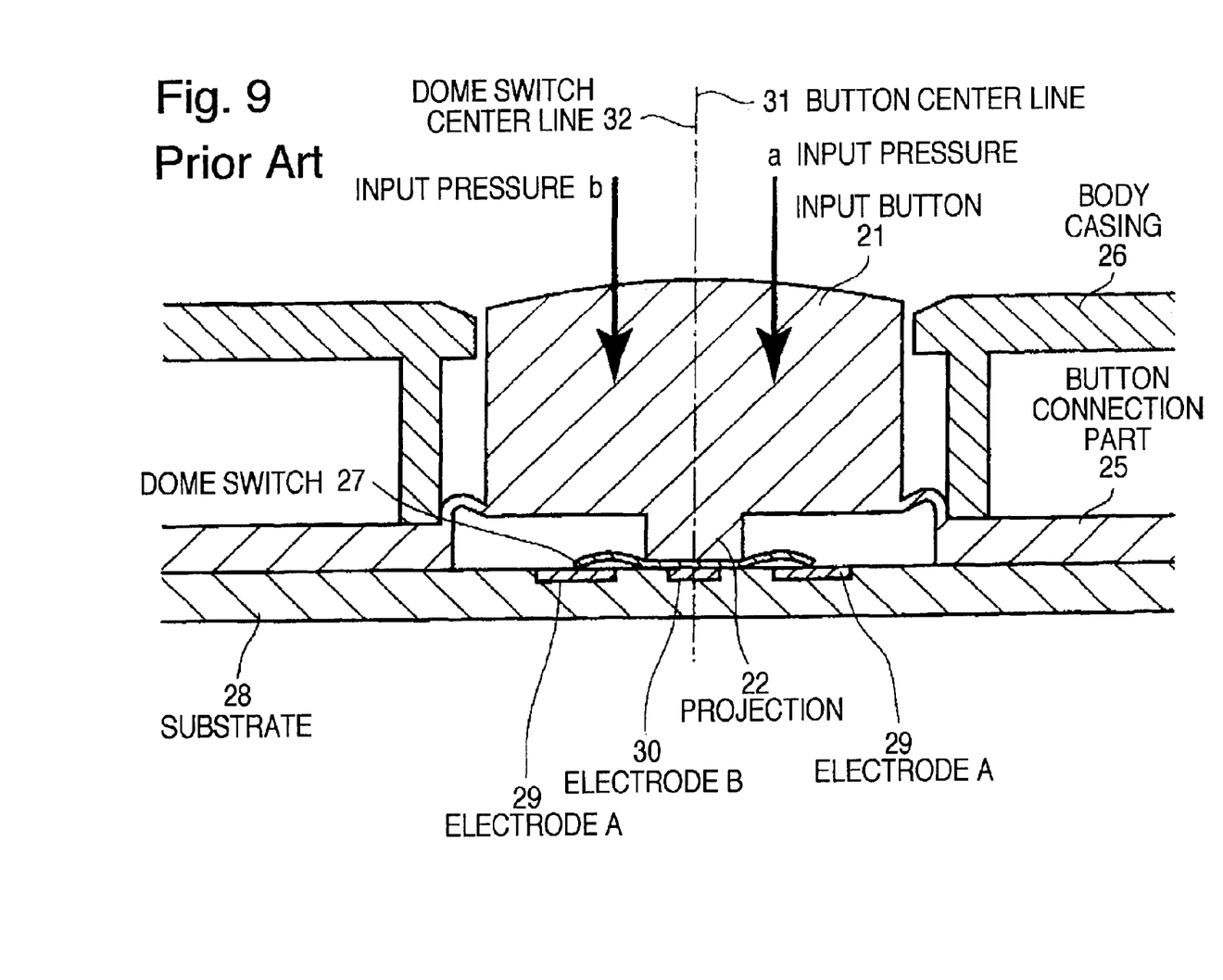
FIG. 9 is a view similar to FIG. 8 but illustrating a condition that the input button is depressed.

FIG. 8 illustrates a typical example of the above mentioned prior art key button switch structure in which a center line 31 of the input button 21 is coincident with a center line 32 of the dome-like switch contact 27. Accordingly, when a depressing pressure or force is applied to the input button 27, the dome-like switch contact 27 is collapsed in an ideal fashion as shown in FIG. 9, with the result that an electrical interconnection is obtained between the two electrodes A 29 and B 30. In FIG. 9, the arrows "a" and "b" diagrammatically illustrate the input pressure.

Figure 10:
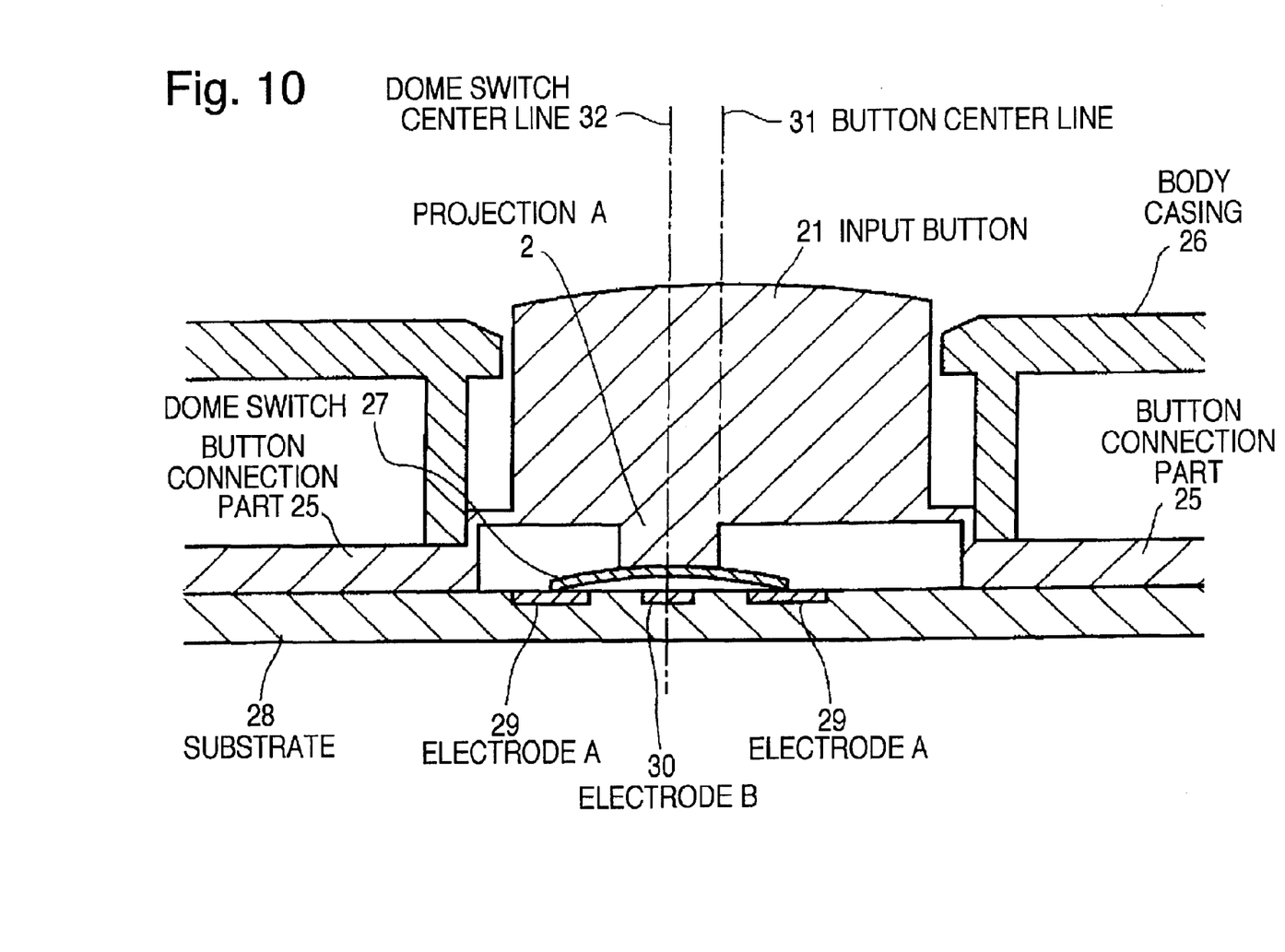
FIG. 10 is a diagrammatic sectional view illustrating an imaginary prior art key button switch structure in which the center line of the input button is positioned off the center line of the dome-like switch contact.
Figure 11:
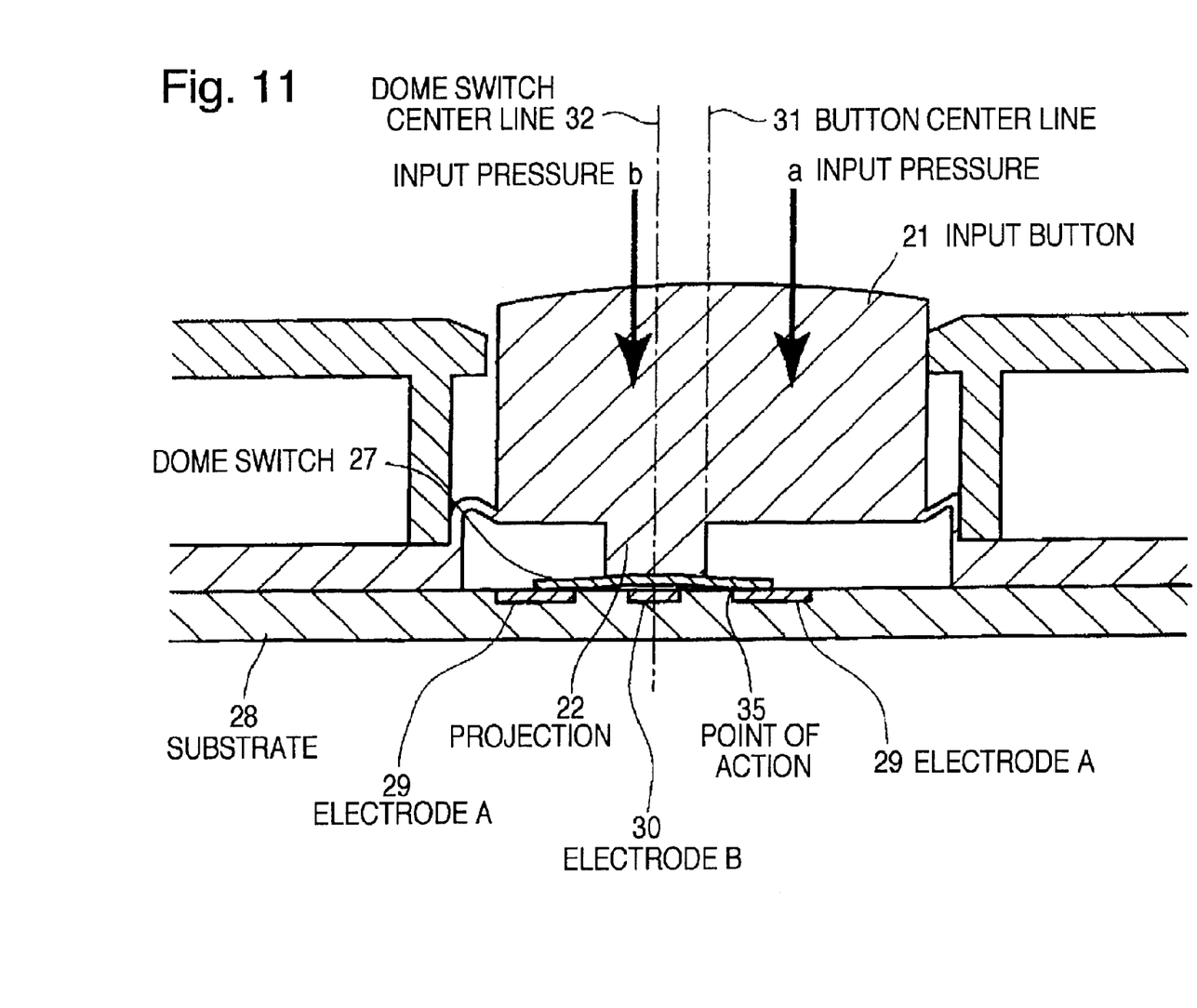
FIG. 11 is a view similar to FIG. 10 but illustrating a condition that the input button is depressed.

On the other hand, referring to FIG. 10, there is shown a diagrammatic sectional view illustrating an imaginary prior art example imaged by the inventors, in which the center line 31 of the input button 21 is not coincident with the center line 32 of the dome-like switch contact 27. When the depressing pressure is applied to the input button 21, since the center line 31 of the input button 21 is deviated from the center line 32 of the dome-like switch contact 27, the input button 21 is inclined in a direction opposite to the deviating direction of the dome-like switch contact 27 from the input button 21 as shown in FIG. 11, with the result that the dome-like switch contact 27 is pushed down from an slant upper position. Furthermore, a center of a depressing force transmitting region is shifted to the neighborhood of a point of action 35 shown in FIG. 11, so that the dome-like switch contact 27 is not sufficiently collapsed.

In the prior art structure, therefore, it is an indispensable condition to align respective center lines of three parts, namely, the input button 21, the projection 22, and the dome-like switch contact 27. The reason for this is that, since the prior art has the structure of electrically interconnecting the electrodes A 29 and B 30 by the dome-like switch contact 27, a depression of a center of the dome-like switch contact 27 in a vertical direction is a necessary condition for deforming the dome-like switch contact 27 in an ideal fashion.

Because of a structure restriction of the dome-like switch contact, if a deviation in a depressing force applying position and angle exceeds a given range of tolerance, the pushing pressure applied to the dome-like switch contact 27 from the input button cannot sufficiently overcome rigidity of the dome-like switch contact 27, so that the dome-like switch contact 27 is not sufficiently deformed, with the result that the contact becomes insufficient or poor.

The dome-like switch contact is effective in thinning the input button structure. However, the location of the input buttons greatly depends upon the position of the dome-like switch contacts located on the substrate. Therefore, the layout of the dome-like switch contacts restricts changes in appearance and precludes easy model changes. Thus, use of common parts and the degree of freedom in appearance are hindered.

BRIEF SUMMARY OF THE INVENTION

Accordingly, it is an object of the present invention to provide a key button switch structure which has overcome the above mentioned problems of the prior art.

Another object of the present invention is to provide a key button switch structure which can be incorporated in a handheld mobile phone and its similar instrument and which never hinders the use of common parts and the degree of freedom in appearance design.

The above and other objects of the present invention are achieved in accordance with the present invention by a key button switch structure for use in a handheld mobile phone and its similar instrument, the key button switch structure comprising an input button having a projection, two electrodes formed on a substrate, and a dome-like switch contact to be pushed down by the projection of the input button when the input button is depressed, thereby to electrically contact both the two electrodes, wherein the input button is so configured to uniformly transmit a push-down pressure applied to the input button, from a bottom surface of the projection of the input button to the dome-like switch contact in the case that an action center line of the dome-like switch contact is not coincident with an input pressure center line of the input button.

Specifically, the input button includes a push-down pressure transmitting projection and a button inclination preventing projection formed on a bottom surface of the input button, integrally with the input button.

Preferably, the input button also includes a recess formed in the bottom surface of the input button, at a side of the push-down pressure transmitting projection opposite to a button inclination preventing projection side.

According to another aspect of the present invention, there is provided a method for forming a key button switch structure for use in a handheld mobile phone and its similar instrument, the method including the steps of forming an input button having a projection, forming two electrodes on a substrate, and providing a dome-like switch contact to be pushed down by the projection of the input button when the input button is depressed, thereby to electrically contact both the two electrodes, wherein the input button is so configured to uniformly transmit a push-down pressure applied to the input button, from a bottom surface of the projection of the input button to the dome-like switch contact in the case that an action center line of the dome-like switch contact is not coincident with an input pressure center line of the input button.

Specifically, the forming of the input button includes forming the input button integrally with a push-down pressure transmitting projection and a button inclination preventing projection both projected from a bottom surface of the input button.

Preferably, the forming of the input button also includes formation of a recess in the bottom surface of the input button, at a side of the push-down pressure transmitting projection opposite to a button inclination preventing projection side.

The above and other objects, features and advantages of the present invention will be apparent from the following description of preferred embodiments of the invention with reference to the accompanying drawings.

DETAILED DESCRIPTION OF THE INVENTION

Figure 1:
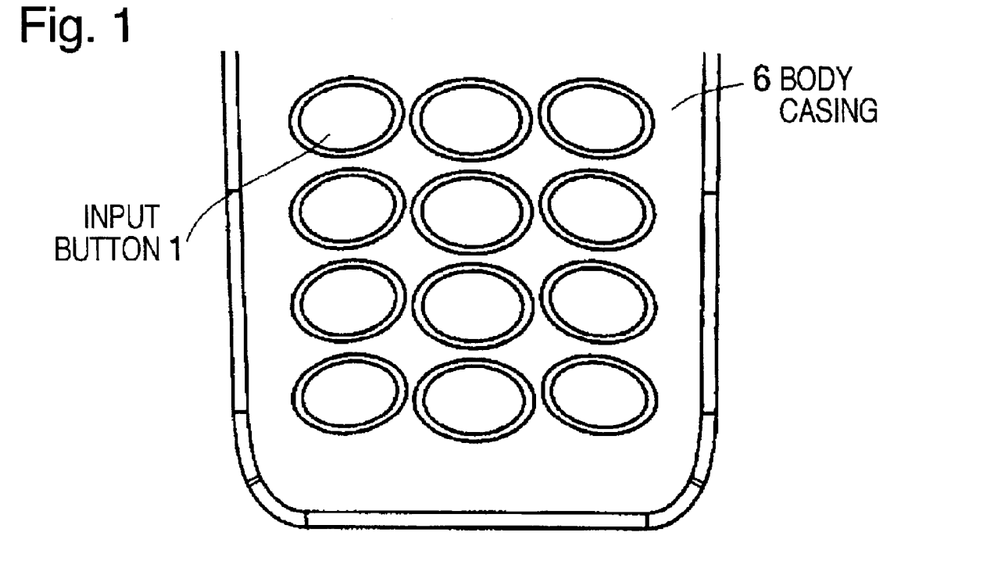
FIG. 1 is a partial front view for diagrammatically illustrating an input button array section of a front part of a handheld mobile phone having a first embodiment of the key button switch structure in accordance with the present invention.

Referring to FIG. 1, there is shown a partial front view for diagrammatically illustrating an input button array section of a front part of a handheld mobile phone having a first embodiment of the key button switch structure in accordance with the present invention. As shown in FIG. 1, a plurality of input buttons 1 are located in a front face of a body casing 6 of the handheld mobile phone.

Figure 2:
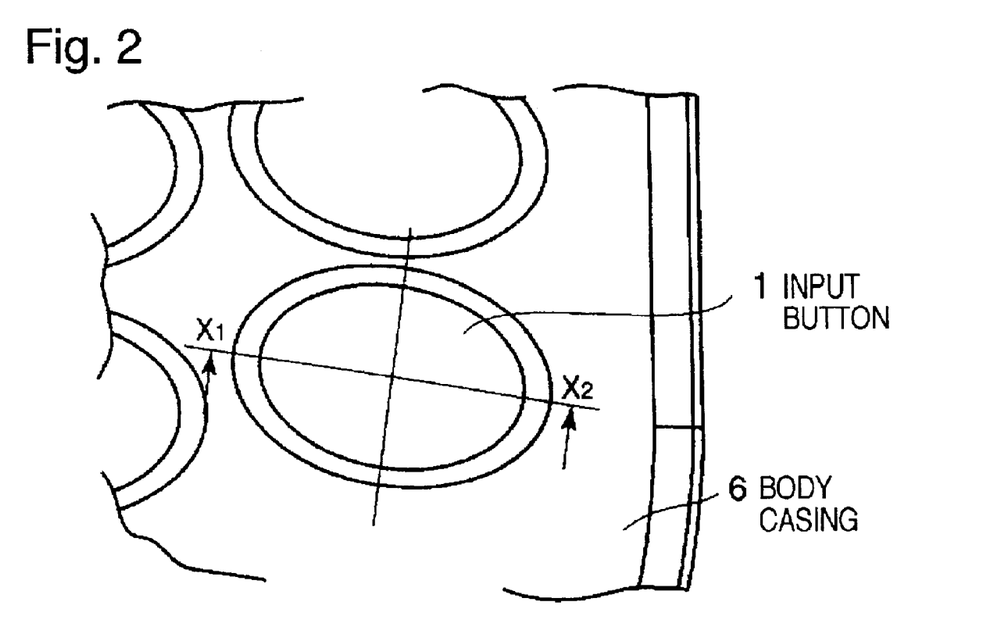
FIG. 2 is an enlarged partial front view for diagrammatically illustrating one input button shown in FIG. 1.
Figure 3:
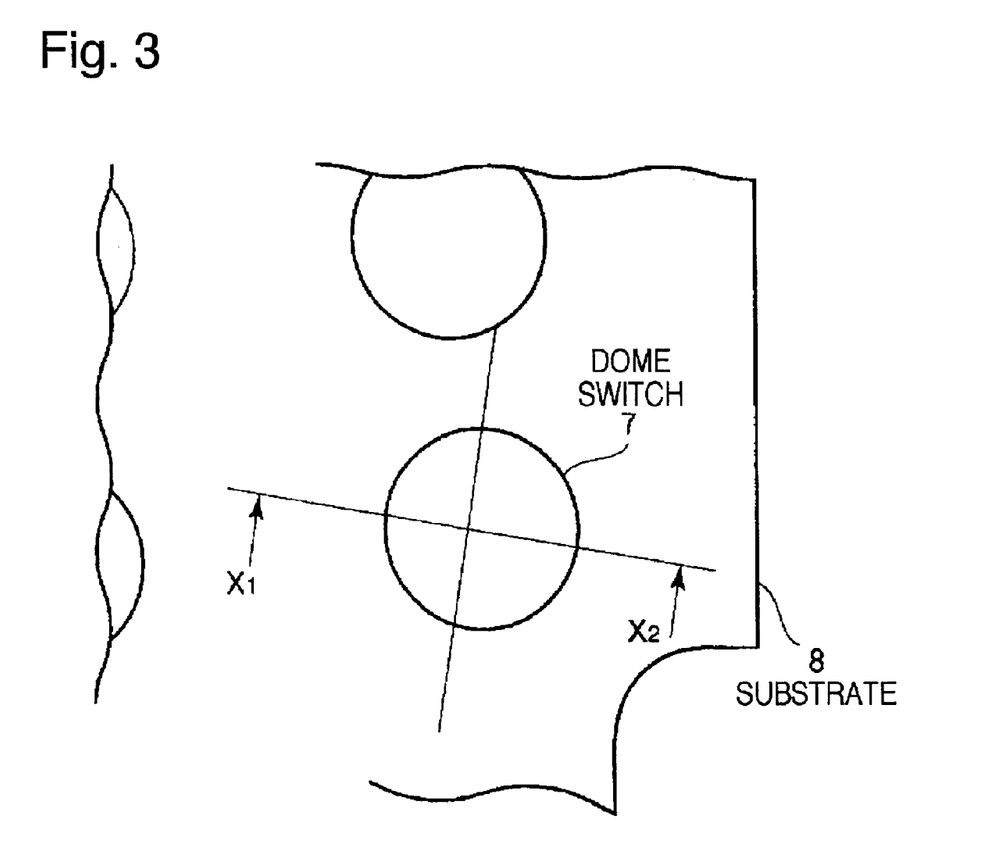
FIG. 3 is a view similar to FIG. 2 but illustrating a condition in which a body casing and the input button are removed so that a substrate becomes viewable.

FIG. 2 is an enlarged partial front view for diagrammatically illustrating one input button shown in FIG. 1, and FIG. 3 is a view similar to FIG. 2 but illustrating a condition in which the body casing 6 and the input buttons 1 are removed so that a substrate becomes viewable. As seen from FIG. 3, a dome-like switch contact 7 is located on a substrate 8 which is mounted in the body casing (not shown in FIG. 3 but shown in FIG. 2).

Figure 4:
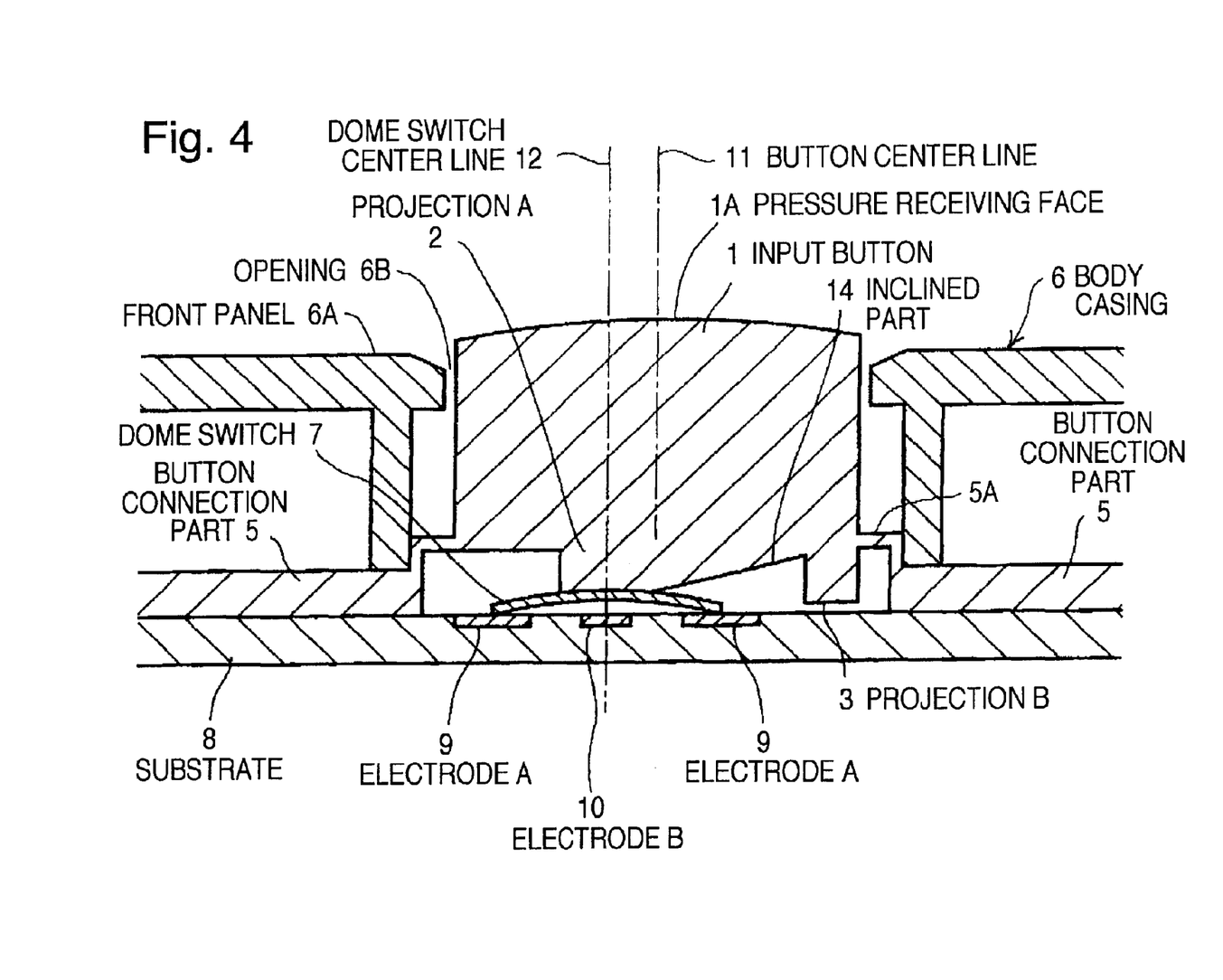
FIG. 4 is a diagrammatic sectional view taken along the line X1–X2 in FIGS. 2 and 3, for illustrating a sectional structure of the first embodiment of the key button switch structure in accordance with the present invention.

Referring to FIG. 4, there is shown a diagrammatic sectional view taken along the line X1–X2 in FIGS. 2 and 3, for illustrating a sectional structure of the first embodiment of the key button switch structure in accordance with the present invention.

In FIG. 4, the substrate 8 and the body casing 6 of the handheld mobile phone are fixed to each other, so that a positional relation between the substrate 8 and the body casing 6 never changes. As shown in FIG. 4, the input button 1 has an input pressure receiving front face 1A exposed through an opening 6B formed in a front panel 6A of the body casing 6. The input button 1 also has a projection A 2 and a projection B 3 formed on a bottom face which is opposite to the pressure receiving front face 1A and which opposes to the substrate 8. A bottom face of the projection A 2 acts as a face for transmitting an input pressure or force received by the input button 1 to a dome-like switch contact 7. The input button 1 is integral at its side wall with a button connection part 5 through a flexible junction 5A, and the shown input button 1 and not-shown other input buttons are integral with the button connection part 5 in the form of an integral sheet. For example, the input button 1 including the projection A 2 and a projection B 3 and the button connection part 5 can be integrally formed of plastics or a rubber having a relative high hardness.

As seen from FIG. 3 and FIG. 4, the dome-like switch contact 7 is formed of a thin sheet in a dome shape having a function of a leaf spring or disk spring and formed of a metal or a resin having a good electrically conductivity. Regardless of whether or not the dome-like switch contact 7 is collapsed, the dome-like switch contact 7 is in ceaseless contact with an electrode A 9 (outer electrode of annular electrode) formed on the substrate 8.

Although not shown for simplification of the drawing, the dome-like switch contact 7 is covered with a thin vinyl-based sheet so that the dome-like switch contact 7 is retained or held on the substrate 8 and is in ceaseless contact with the electrode A 9. An electrode B 10 (center electrode or point electrode) is formed on the substrate 8 to be positioned at a center of the electrode A 9, so that the electrode B 10 is never in contact with the dome-like switch contact 7 when the dome-like switch contact 7 is in a non-collapsed condition. Thus, when the input button 1 is depressed to push down a center top portion of the dome-like switch contact 7 by the bottom face of the projection A 2, the dome-like switch contact 7 is collapsed to physically contact both the electrode A 9 and the electrode B 10, thereby to electrically interconnect between the electrode A 9 and the electrode B 10.

Figure 5:
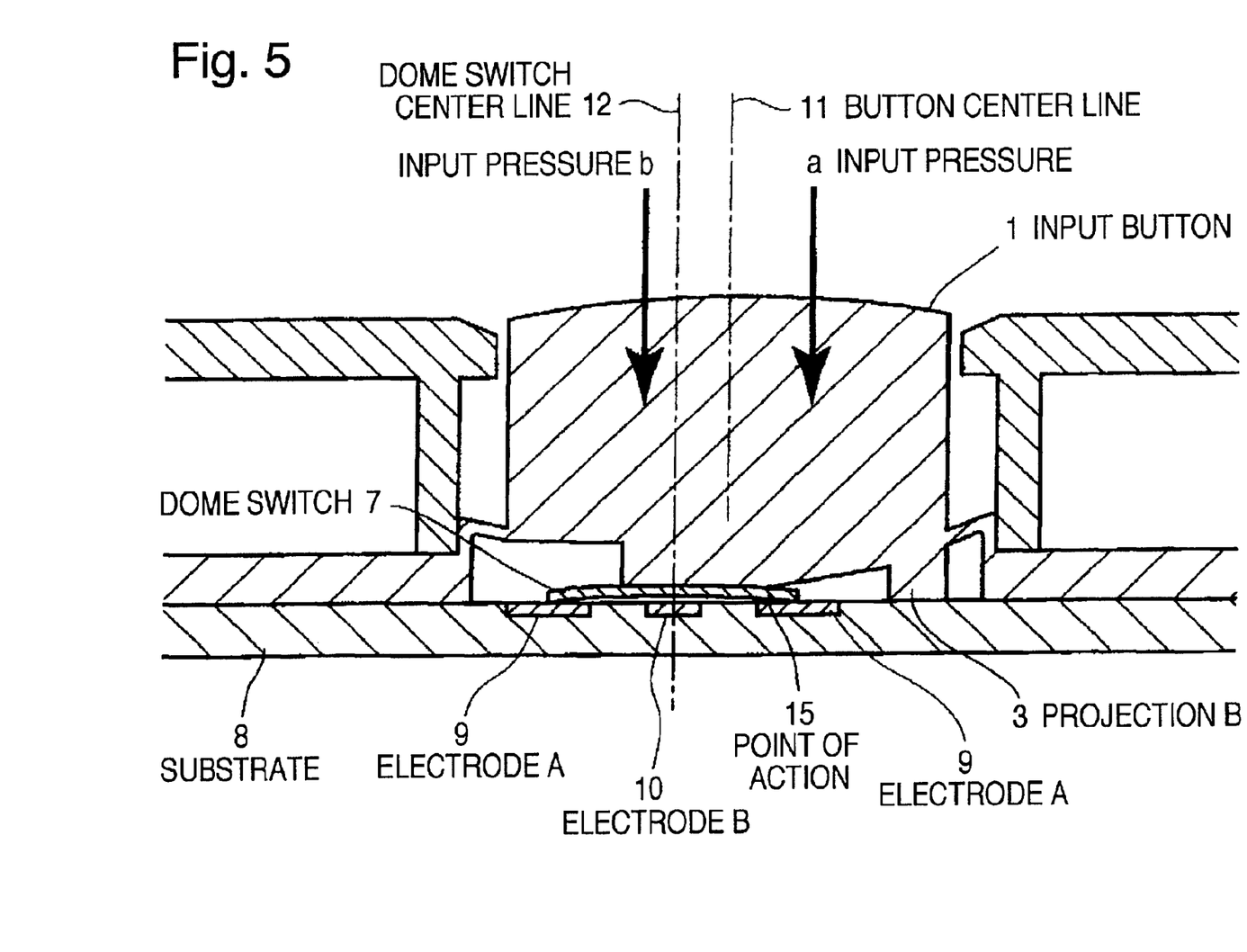
FIG. 5 is a view similar to FIG. 4 but illustrating a condition that the input button is depressed.

Referring to FIG. 5, there is shown a view similar to FIG. 4 but illustrating a condition that the input button 1 is depressed.

The shown embodiment is based on the premise that a center line 11 of the input button 1 is positioned off a center line 12 of the dome-like switch contact 7, as seen from FIG. 4. Under this premise, the projection B3 is formed at a side edge opposite to the deviating direction of the center line 12 of the dome-like switch contact 7 from the center line 11 of the input button 1 as shown in FIG. 4, in order to prevent the inclination of the input button when the input button 1 is depressed to displace toward the substrate 8.

In order to uniformly transmit the push-down pressure or force applied to a center part of the input button 1, to the bottom surface of the projection A 2 having a center point deviated from the center line 11 of the input button 1, an inclined part 14 is formed on a side of the projection A2 near to the projection B 3, as shown in FIG. 4. With this arrangement, since the input button 1 is supported at two points given by the projection A 2 and the projection B3, the shape of the side of the input button 1 facing the substrate 8 is shaped to be asymmetrical so as to give an increased rigidity to the input button 1, thereby to prevent the portion between the projection A 2 and the projection B3 from being bowed by the depressing pressure or force.

As seen from the above, the key button switch structure of the shown embodiment is featured in that since a bottom surface of the input button is formed with a push-down pressure transmitting projection (projection A 2) and a button inclination preventing projection (projection B 3), and since the rigidity of the input button 1 is enhanced or stiffened, even in the case that the action center line 12 of the dome-like switch contact 7 is not coincident with the input pressure center line 11 of the input button 1, it is possible to prevent poor electrical contact between the electrodes A 9 and B 10 when the input button is depressed.

Figure 6:
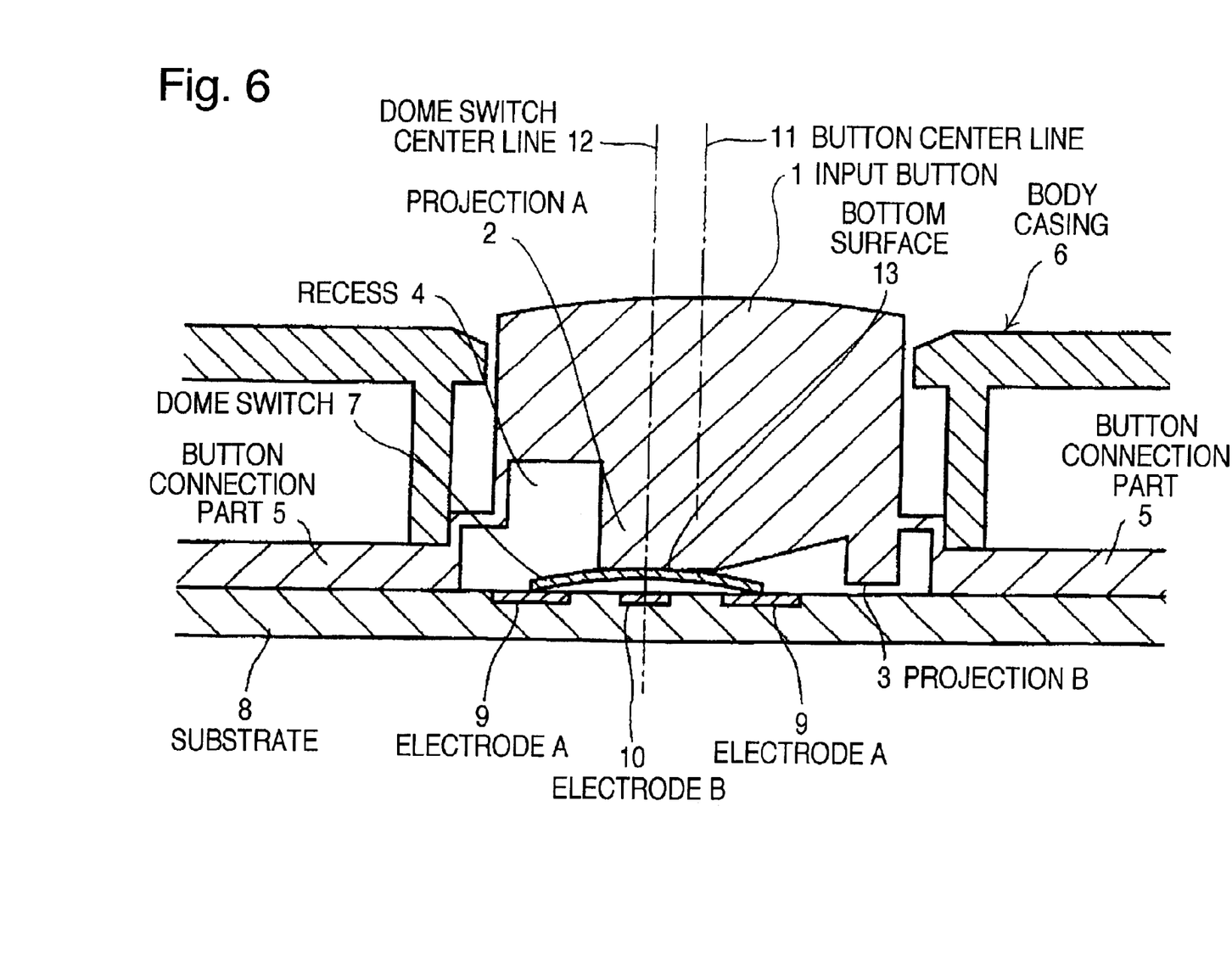
FIG. 6 is a view similar to FIG. 4 but illustrating a second embodiment of the key button switch structure in accordance with the present invention.

Referring to FIG. 6, there is shown a view similar to FIG. 4 but illustrating a second embodiment of the key button switch structure in accordance with the present invention. In FIG. 6, elements corresponding to those shown in FIGS. 4 and 5 are given the same reference numbers, and explanation will be omitted for simplification of the description.

As seen from comparison between FIG. 4 and FIG. 6, the second embodiment of the key button switch structure shown in FIG. 6 includes a recess 4 at a side of the projection A 2 opposite to the inclined part 14.

In the key button switch structure shown in FIG. 4, the projection B 3 is formed to prevent inclination of the input button 1, and since the input button 1 is supported at the two points given by the projection A 2 and the projection B3, the inclined part 14 is formed to extend from the projection A 2 to a base of the projection B3 so as to give an increased rigidity, thereby to prevent the portion between the projection A 2 and the projection B3 from being bowed by the depressing pressure or force. As a result, when the input button 1 is depressed, the inclination of the input button 1 is prevented as shown in FIG. 5. However, the center of the transmission of the input depressing pressure is still at the neighborhood of a point of action 15, and therefore, the collapse of the dome-like switch contact 7 often becomes unstable because of an error in manufacturing.

Figure 7:
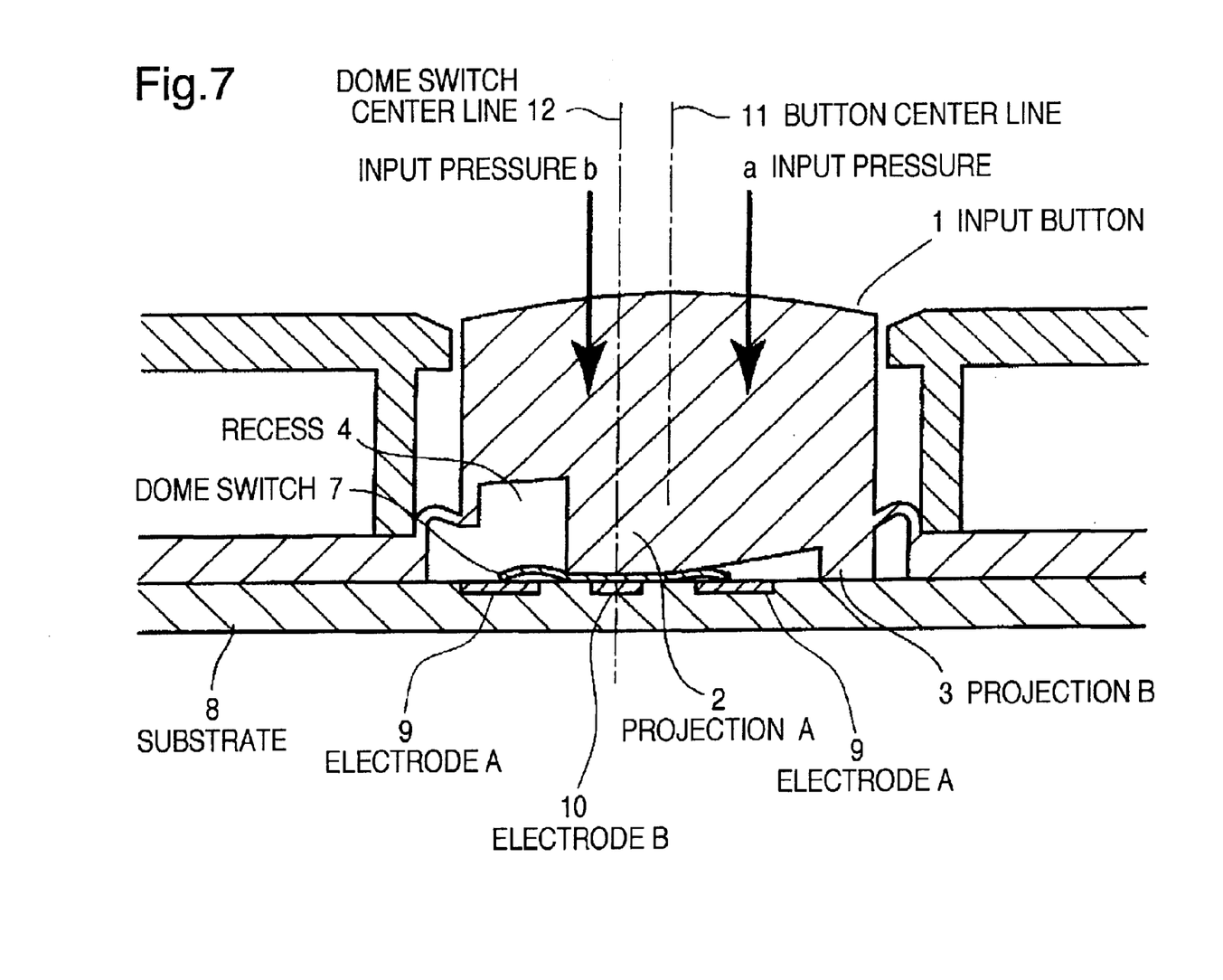
FIG. 7 is a view similar to FIG. 6 but illustrating a condition that the input button is depressed.

In order to overcome this problem, the recess 4 is formed in the embodiment shown in FIG. 6. FIG. 7 is a view similar to FIG. 6 but illustrating a condition that the input button 1 is depressed. The example shown in FIG. 7 is different from the example shown in FIG. 5 in that since the recess 4 is formed, an apparent boundary plane is created at a left side of the projection A 2 in the drawing, so that the rigidity is increased in the neighborhood of the boundary plane, with the result that the efficiency of the transmission of the input depressing pressure or force is elevated. Thus, the pressure transmitted to the bottom surface of the projection A2 shown in FIG. 6 is uniformized over the bottom surface of the projection A2, so that an ideal push-down pressure or force is transmitted to the dome-like switch contact 7, and therefore, a good electrical conduction is surely obtained between the electrode A9 and the electrode B10.

As seen from the above, the above mentioned first and second embodiments of the key button switch structure in accordance with the present invention is characterized in that in a key button switch which has a large depressing area and which can be used in a handheld mobile phone and the like, since the push-down pressure transmitting projection and the button inclination preventing projection are formed on and integrally with the bottom surface of the input button, the following advantages can be obtained:

(1) It is possible to improve the thinning and the weight-reducing of an instrument having the key button switch structure;

(2) It is possible to increase the extent of utilization of existing parts, to increase the yield of production, to reduce the size of the instrument, to facilitate the handling, to freely design the size and the specification, and to increase the degree of freedom in appearance design; and (3) It is possible to improve a working procedure until the key button switch structure is incorporated into the body casing.

The present invention has been explained with reference to the handheld mobile phone having the key button switch structure in accordance with the present invention. However, the present invention is in no way limited to the key button switch structure of the handheld mobile phone, but can be applied to any instrument and apparatus which can have the key button switch structure.

As seen from the above, according to the present invention, even in the case that the action center line of the dome-like switch contact is not coincident with the input pressure center line of the input button, the inclination of the input button is prevented, so that the variation in the contact angle between the bottom surface of the push-down pressure transmitting projection and the contacting region of the dome-like switch contact is minimized, thereby to uniformly transmit the push-down pressure applied to the input button, from the bottom surface of the push-down pressure transmitting projection of the input button to the dome-like switch contact.

Furthermore, since the recess is formed at the side of the push-down pressure transmitting projection opposite to the input button center line side, the rigidity of the input button in the periphery of the push-down pressure transmitting projection is adjusted, to uniformize the push-down pressure applied from the bottom surface of the push-down pressure transmitting projection. Therefore, even if the center line of the dome-like switch contact is deviated from the center line of the input button, it is possible to surely contact the dome-like switch contact to both the electrodes A and B.

Accordingly, it is possible to improve the thinning and the weight-reducing of an instrument having the key button switch structure which has a large depressing area and which can be used in a handheld mobile phone and the like.

It is possible to increase the extent of utilization of existing parts, to increase the yield of production, to reduce the size of the instrument, to facilitate the handling, to freely design the size and the specification, and to increase the degree of freedom in appearance design; and It is possible to improve a working procedure until the key button switch structure is incorporated into the body casing.

The invention has thus been shown and described with reference to the specific embodiments. However, it should be noted that the present invention is in no way limited to the details of the illustrated structures but changes and modifications may be made within the scope of the appended claims.

What is claimed is

1. A key button switch structure comprising:
   an input button having a first projection, two electrodes formed on a substrate, and a dome-like switch contact to be pushed down by said first projection of said input button when said input button is depressed, thereby to electrically contact both said two electrodes,
   wherein said input button further comprises means for preventing inclination of said input button when an action center line of said dome-like switch contact is not coincident with an input pressure center line of said input button and said input button is depressed, wherein said means for preventing inclination comprises a second projection that is spaced from said first projection and that contacts said substrate when said input button is depressed, and wherein said input button has a bottom surface that is sloped continuously from a distal end of said first projection to a base of said second projection.

2. A key button switch structure comprising:

an input button having a first projection on a bottom surface of said input button;

two electrodes on a substrate;

a dome-like switch contact arranged to be pushed down by said first projection when said input button is depressed, thereby to electrically contact both said two electrodes; and a button inclination preventing projection on the bottom surface of said input button, wherein said bottom surface is sloped continuously from a distal end of said first projection to a base of said button inclination preventing projection.

3. A key button switch structure comprising:

an input button having two projections spaced apart on a bottom surface of said input button;

two electrodes on a substrate; and a dome-like switch contact arranged to be pushed down by one of said two projections when said input button is depressed and the other of said two projections contacts said substrate, so that said dome-like switch contact electrically contacts both said two electrodes, wherein said bottom surface is sloped continuously from a distal end of said one projection to a base of said other projection.

4. The key button switch structure of claim 1, wherein said first projection extends a same distance from said bottom surface as said second projection.

* * * * *